(12) United States Patent
Nishio

(10) Patent No.: US 6,991,266 B2
(45) Date of Patent: Jan. 31, 2006

(54) PIPE JOINT MADE OF RESIN

(75) Inventor: Kiyoshi Nishio, Sanda (JP)

(73) Assignee: Nippon Pillar Packing Co., Ltd., Hyogo (JP)

(*) Notice: Subject to any disclaimer, the term of this patent is extended or adjusted under 35 U.S.C. 154(b) by 0 days.

(21) Appl. No.: 10/322,519

(22) Filed: Dec. 19, 2002

(65) Prior Publication Data

US 2003/0085569 A1 May 8, 2003

Related U.S. Application Data

(63) Continuation-in-part of application No. 09/901,639, filed on Jul. 11, 2001, now Pat. No. 6,517,123.

(30) Foreign Application Priority Data

Apr. 20, 2001 (JP) .............................. 2001-122371

(51) Int. Cl.
*F16L 25/00* (2006.01)
(52) U.S. Cl. ..................... 285/331; 285/423; 285/354
(58) Field of Classification Search ............... 285/331, 285/423, 354
See application file for complete search history.

(56) References Cited

U.S. PATENT DOCUMENTS

| | | | | |
|---|---|---|---|---|
| 4,508,374 A | * | 4/1985 | Kantor | ..................... 285/319 |
| 5,388,871 A | * | 2/1995 | Saitoh | ..................... 285/247 |
| 5,553,900 A | * | 9/1996 | Fukumoto et al. | ..................... 285/331 |
| 5,743,572 A | * | 4/1998 | Nishio | ..................... 285/331 |
| 5,951,060 A | * | 9/1999 | Fukano et al. | ..................... 285/92 |
| 5,996,636 A | * | 12/1999 | Fukano et al. | ..................... 138/109 |
| 6,017,066 A | * | 1/2000 | Giuffre' | ..................... 285/38 |
| 6,022,053 A | * | 2/2000 | Hukuda | ..................... 285/331 |
| 6,054,164 A | * | 4/2000 | Roth | ..................... 426/524 |
| 6,089,621 A | * | 7/2000 | Nishio | ..................... 285/331 |
| 6,193,239 B1 | * | 2/2001 | Fukano et al. | ..................... 277/615 |
| 6,517,123 B2 | * | 2/2003 | Nishio | ..................... 285/331 |

* cited by examiner

*Primary Examiner*—Eric K. Nicholson
(74) *Attorney, Agent, or Firm*—Bacon & Thomas

(57) ABSTRACT

The invention provides a pipe joint made of resin in which a predetermined pressing force in the axial direction corresponding to a fastening torque of a union nut can be obtained, and the strength of threads can be enhanced. Each of the threads of an external thread portion of a joint body and an internal thread portion of a union nut is formed asd an asymmetrical trapezoid, an inclined angle $\alpha_1$ of first flanks of the asymmetrical trapezoidal threads which contact with each other by fastening the union nut is set to 70 to 90°, and an included angle $\alpha_2$ of the flanks opposite to the first flanks is set to 40 to 80°, and wherein the joint body defines a sealing portion the angle and direction of taper of which is defined by an angle $\theta_0$, said external thread is defined by an angle $\theta_1$, where $\theta_1 = \alpha_1$ and wherein $\theta_0 < \theta_1$ and $|\cos \theta_0| > |\cos \theta_1|$.

4 Claims, 6 Drawing Sheets

US 6,991,266 B2

PIPE JOINT MADE OF RESIN

CROSS REFERENCE TO RELATED APPLICATION

This application is a CIP of application Ser. No. 09/901,639 Filed on Jul. 11, 2001 now U.S. Pat. No. 6,517,123.

BACKGROUND OF THE INVENTION

1. Field of the Invention

The present invention relates to a pipe joint made of resin which is preferably used in piping for a liquid having high purity or ultrapure water to be handled in a production process in, for example, the production of semiconductor devices, the production of medical equipment and medicines, for food processing, and in the chemical industry.

2. Description of the Prior Art

Conventionally, as pipe joints made of resin of this kind, those having a configuration like that shown in FIGS. 4 to 6 are known. Among them, the pipe joint made of resin shown in FIG. 4 (see Japanese Utility Model Publication No. 7-20471) comprises a joint body 1, a sleeve 2, and a union nut 3 which are made of resin. In the joint body 1, a pipe receiving port 5 is formed at one end in the axial direction. A first sealing portion 6 is formed in an inner area of the pipe receiving port 5, and a second sealing portion 7 is formed in an entrance area of the pipe receiving port 5 so that the sealing portions intersect the axis C of the joint body 1. An external thread portion 9 is formed on the outer periphery of the pipe receiving port 5. In the sleeve 2, a fitting portion 10 having an outer diameter that allows the portion to be fitted into the receiving port 5 of the joint body 1 is formed in an inner end portion in the axial direction, and a bulge portion 15 having a mountain-like section shape is formed in an outer end side in the axial direction. The sleeve 2 is pressingly inserted into one end portion 17 of a tube 11 made of resin under a state where the fining portion 10 projects outwardly. As a result of this press insertion, the diameter of the one end portion 17 of the tube 11 is increased. An inner end sealing portion 13 which abuts against the sealing portion 6 of the joint body 1 is formed in an end portion of the fitting portion 10, and an outer peripheral sealing face 18 which abuts against the sealing portion 7 of the pipe receiving port 5 is formed in a place corresponding to the bulge portion 15. In the union nut 3, an internal thread portion 20 which is to be screwed to the external thread portion 9 of the joint body 1 is formed.

The one end portion 17 of the tube 11 into which the sleeve 2 is pressingly inserted is inserted into the receiving port 5 of the joint body 1. Under this state, the internal thread portion 20 of the union nut 3 which is previously loosely fitted onto the outer periphery of the one end portion 17 of the tube 11 is screw-fastened to the external thread portion 9 of the joint body 1. This fastening causes the sleeve 2 to be pressed in the axial direction, so that the inner end sealing portion 13 and the outer peripheral sealing face 18 of the sleeve 2 abut against the sealing portions 6 and 7 of the pipe receiving port 5 of the joint body 1, respectively, thereby exerting a sealing function.

In the pipe joint made of resin shown in FIG. 5, a tapered sealing portion 30 in which the diameter is gradually reduced toward the inner side in the axial direction is formed in an entrance area of a receiving port 5 of a joint body 1 into which the one end portion 17 of the tube 11 made of resin is to be inserted, and a sealing portion 31 which abuts against a tapered sealing portion 30 is formed in the inner end of a sleeve 2. The sleeve 2 is fitted onto the one end portion 17 of the tube 11, whereby a bulge portion 32 which is locally projected toward the radially inner side is formed on the one end portion 17 of the tube 11. The internal thread portion 20 of the union nut 3 which is previously loosely fitted onto the outer periphery of the one end portion 17 of the tube 11 is fastened to an external thread portion 9 of the joint body 1. This fastening causes the sleeve 2 to be pressed in the axial direction, so that sealing portions 30 and 31 abut against each other, thereby exerting a sealing function.

In the pipe joint made of resin shown in FIG. 6, a tapered sealing portion 33 in which the diameter is gradually reduced toward the inner side in the axial direction is formed in an entrance area of a receiving port 5 of a joint body 1 into which the one end portion 17 of the tube 11 made of resin is to be inserted. A sleeve 2 which has an outer peripheral wall 34 having a trapezoidal section shape is pressingly inserted into the inner periphery of the one end portion 17 of the tube 11. As a result of this press insertion, a bulge portion 35 which is locally projected toward the radially outer side along the outer peripheral wall 34 of the sleeve 2 is formed on the tube 11. The internal thread portion 20 of the union nut 3 which is previously loosely fitted onto the outer periphery of the one end portion 17 of the tube 11 is fastened to an external thread portion 9 of the joint body 1, whereby the bulge portion 35 of the tube 11 and the sleeve 2 are pressed against the joint body 1 and an inclined face 36 on the tube end side of the bulge portion 35 is pressed against the tapered sealing portion 33 in the axial direction, so as to exert a sealing force.

As described above, all of the conventional pipe joints made of resin shown in FIGS. 4 to 6 comprise: the joint body 1 which is made of resin, and which has the pipe receiving port 5 in one end portion, and the external thread portion 9 on the outer periphery of the pipe receiving port 5; the sleeve 2 which is made of resin, and which is to be pressingly inserted into the inner or outer periphery of the one end portion 17 of the tube 11 made of resin to be integrated therewith; and the union nut 3 which is made of resin, which is loosely fitted onto the outer periphery of the one end portion 17 of the tube 11, and which is screwed via the internal thread portion 20 to the external thread portion 9 of the joint body 1. The one end portion 17 of the tube 11 into which the sleeve 2 is pressingly inserted to be integrated therewith is inserted into the pipe receiving port 5 of the joint body 1. The gap between the one end portion 17 of the tube 11 and the pipe receiving port 5 of the joint body 1 is sealed in a water blocking manner via the sleeve 2 which is pressed against the joint body 1 by fastening the union nut 3.

In all of the conventional pipe joints made of resin, the external thread portion 9 of the joint body 1 and the internal thread portion 20 of the union nut 3 use triangular threads according to usual thread standards. Such triangular threads have an included angle of 55° or 60° (see FIG. 4).

However, usual thread standards are originally introduced for metals, and, in some cases, are not suitable to threads for resin such as those for a pipe joint made of resin because, when a pipe joint is made of resin, creep deformation which advances over time under a constant load is largely affected by the load and the temperature.

In the pipe joint made of resin in which the sleeve 2 and the joint body 1 are pressed against each other by fastening the union nut 3, a creep phenomenon and stress relaxation due to the phenomenon occur in a portion where the sleeve 2 and the joint body 1 are pressed, thereby causing the liquid to leak or the tube 11 to slip off. Therefore, functions which are exerted by pressing the two components, i.e., the sleeve 2 and the joint body 1, such as the sealing function, and the function of preventing the tube 11 from slipping off must be ensured. Therefore, it is required to set a pressing force which is necessary and sufficient for exerting functions such as the sealing function. In the case where a creep phenomenon or the like occurs and the union nut 3 is to be further fastened, adjustment of the pressing force must be performed at a higher degree.

As the resin material of a pipe joint of this kind, fluororesin which has excellent heat resistance and chemical resistance is usually used. When triangular threads according to usual metal thread standards are applied to the internal thread portion 20 of the union nut 3 and the external thread portion 9 of the joint body 1 which are made of such fluororesin, it is sometimes difficult to obtain a desired pressing force in the axial direction corresponding to the fastening torque of the union nut 3 under severe and extreme use conditions which are much severer than usual use conditions, such as those in which the temperature of a fluid to be transported is higher than 200° C., or the pressure of the fluid is higher than 1 MPa. Even when the internal and external thread portions 20 and 9 are not broken, there arises a case where the sealing property and the resistance to tube slipping off which are required in a pipe joint are not sufficiently satisfied. Specifically, a remarkable creep phenomenon of the resin material may cause a case where the force (fastening torque) of rotating the union nut 3 in the fastening direction exceeds the strength of the threads and the threads are broken, or that where the internal thread portion 20 of the union nut 3 slips over threads of the external thread portion 9 of the joint body 1, and the union nut 3 swells toward the radially outer side, so that the internal thread portion 20 is disengaged from the external thread portion 9 and the union nut is freely rotated.

SUMMARY OF THE INVENTION

The present invention solves the noted problems. It is an object of the invention to provide a pipe joint made of resin in which an asymmetrical trapezoidal thread is used as a section shape of threads of a union nut and a joint body that are made of resin, improvements are then made on the setting of the included angle, whereby, even under severe use conditions in which a fluid of a high temperature and a high pressure is transported, and which are much more severe than usual use conditions, a predetermined pressing force in the axial direction corresponding to the fastening torque of the union nut can be obtained, and the strength of the threads can be enhance.

The pipe joint made of resin of the invention comprises: a joint body 1 which is made of resin, and which has a pipe receiving port 5 at one end portion, and an external thread portion 9 on an outer periphery of the pipe receiving port; a sleeve 2 which is made of resin, and which is to be pressingly inserted into an inner or outer periphery of an one end portion 17 of a tube 11 made of resin, to be integrated therewith; and a union nut 3 which is made of resin, and which is loosely fitted onto the outer periphery of the one end portion 17 of tube 11, and which is screwed via an internal thread portion 20 to the external thread portion 9 of the joint body.

The pipe joint made of resin of the invention comprises: a joint body 1 which is made of resin, and which has a pipe receiving port 5 in one end portion, and an external thread portion 9 on an outer periphery of the pipe receiving port; a sleeve 2 which is made of resin, and which is to be pressingly inserted into an inner or outer periphery of an one end portion 17 of a tube 11 made of resin, to be integrated therewith; and a union nut 3 which is made of resin, and which is loosely fitted onto the outer periphery of the one end portion 17 of the tube 11, and which is screwed via an internal thread portion 20 to the external thread portion 9 of the joint body 1. The one end portion 17 of the tube 11 into which the sleeve 2 is pressingly inserted to be integrated therewith is inserted into the pipe receiving port 5 of the joint body 1. A gap between the one end portion 17 of the tube 11 and the pipe receiving port 5 of the joint body 1 is sealed via the sleeve 2 which is pressed against the joint body 1 by fastening the union nut 3. The pipe joint made of resin is characterized in that a section shape of each of the threads of the external thread portion 9 of the joint body 1 and the internal thread portion 20 of the union nut 3 is formed as an asymmetrical trapezoid, an included angle $\alpha_1$ of flanks 9a and 20a of the asymmetrical trapezoidal threads which are in contact with each other by fastening the union nut 3 is set to 70 to 90°, and an included angle $\alpha_2$ of flanks 9b and 20b opposite to the flanks is set to 40 to 80° (which is an angle smaller than the included angle $\alpha_1$). See FIG. 2.

According to the thus configured pipe joint made of resin of the invention, the external thread portion 9 of the joint body 1 and the internal thread portion 20 of the union nut 3 are formed as asymmetrical trapezoidal threads, and the included angle of the flanks 9a and 20a of the asymmetrical trapezoidal threads which are made in contact with each other by fastening the union nut 3 is set to 70 to 90°. Therefore, fastening of the union nut 3 can be surely done and this can ensure a pressing force in the axial direction which is larger than that obtained in a conventional case where the above-mentioned triangular threads of an included angle of 27.5° or 30° are used. Since the included angle of the flanks 9b and 20b opposite to the flanks is set to 40 to 80° (which is an angle smaller than the included angle $\alpha_1$), the threads can sufficiently withstand a shearing load which is applied to the threads as a result of exerting a high fastening torque, and a friction force of a relatively higher degree can be obtained so as to ensure also a locking effect.

When the included angle of the flanks 9a and 20a of the asymmetrical trapezoidal threads is smaller than 70°, a necessary and sufficient pressing force cannot be obtained in the same manner as a conventional case where the above-mentioned triangular threads of an included angle of 27.5° or 30° are used. When the included angle of the other flanks 9b and 20b of the asymmetrical trapezoidal threads is smaller than 40°, threads of a sufficient height cannot be obtained at a predetermined pitch, and, when the included angle is larger than 80°, a high fastening torque of the union nut 3 may cause the threads to be cracked or broken, and the locking effect is low.

In this way, the external thread portion 9 of the joint body 1 and the internal thread portion 20 of the union nut 3 have a structure in which a large pressing force in the axial direction corresponding to the fastening torque can be obtained, and the strength of the threads is enhanced so that the threads can withstand a high fastening torque of the union nut 3. Even when a high fastening torque of the union nut 3 is applied, the threads of the internal thread portion are prevented from moving toward the radially outer side to cause the union nut to be freely rotated. According to this configuration, in addition to the case where the temperature of the liquid to be transported is the ordinary temperature (room temperature), even in the case where the liquid to be transported is a fluid of a high temperature (hot water of 200° C.), the rotation amount (the number of rotations and the rotation angle) of the union nut 3 for stably exerting the sealing property and the resistance to tube slipping off is extremely stabilized. Therefore, a pressing force required for the sealing property and the resistance to tube slipping off can be exerted by giving only a constant rotation amount to the union nut 3.

As described above, according to the invention, the external thread portion of the joint body and the internal thread portion of the union nut have a structure in which, even under severe use conditions wherein a fluid of a high temperature and a high pressure is transported, and which are much more severe than usual use conditions, a large pressing force in the axial direction can be produced, and the strength of the threads is enhanced so that the threads can withstand a high fastening torque of the union nut. Even when a high fastening torque of the union nut is applied, moreover, the threads of the internal thread portion can be prevented from moving toward the radially outer side to cause the union nut to be freely rotated. Therefore, the invention attains an effect that, in both the cases where the liquid to be transported is a fluid of the ordinary temperature, and where the liquid is a fluid of a high temperature, a pressing force required for the sealing property and the resistance to tube slipping off, and the joint can be suitable used as a pipe joint made of resin can be exerted by giving only a constant rotation amount to the union nut.

DETAILED DESCRIPTION OF THE PREFERRED EMBODIMENT

Figure 1:
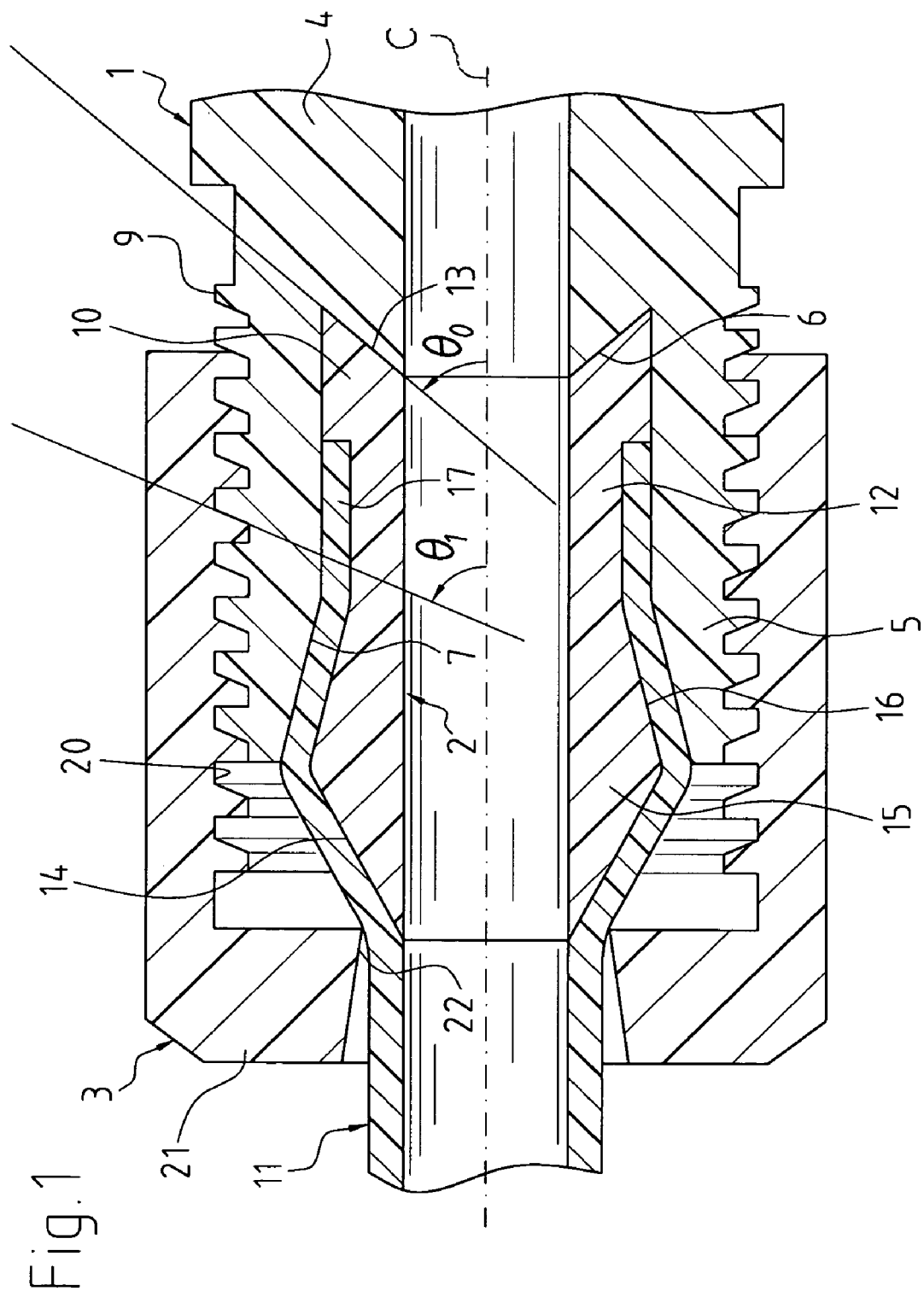
FIG. 1 is a section view of a pipe joint made of resin which is an embodiment of the invention.
Figure 2:
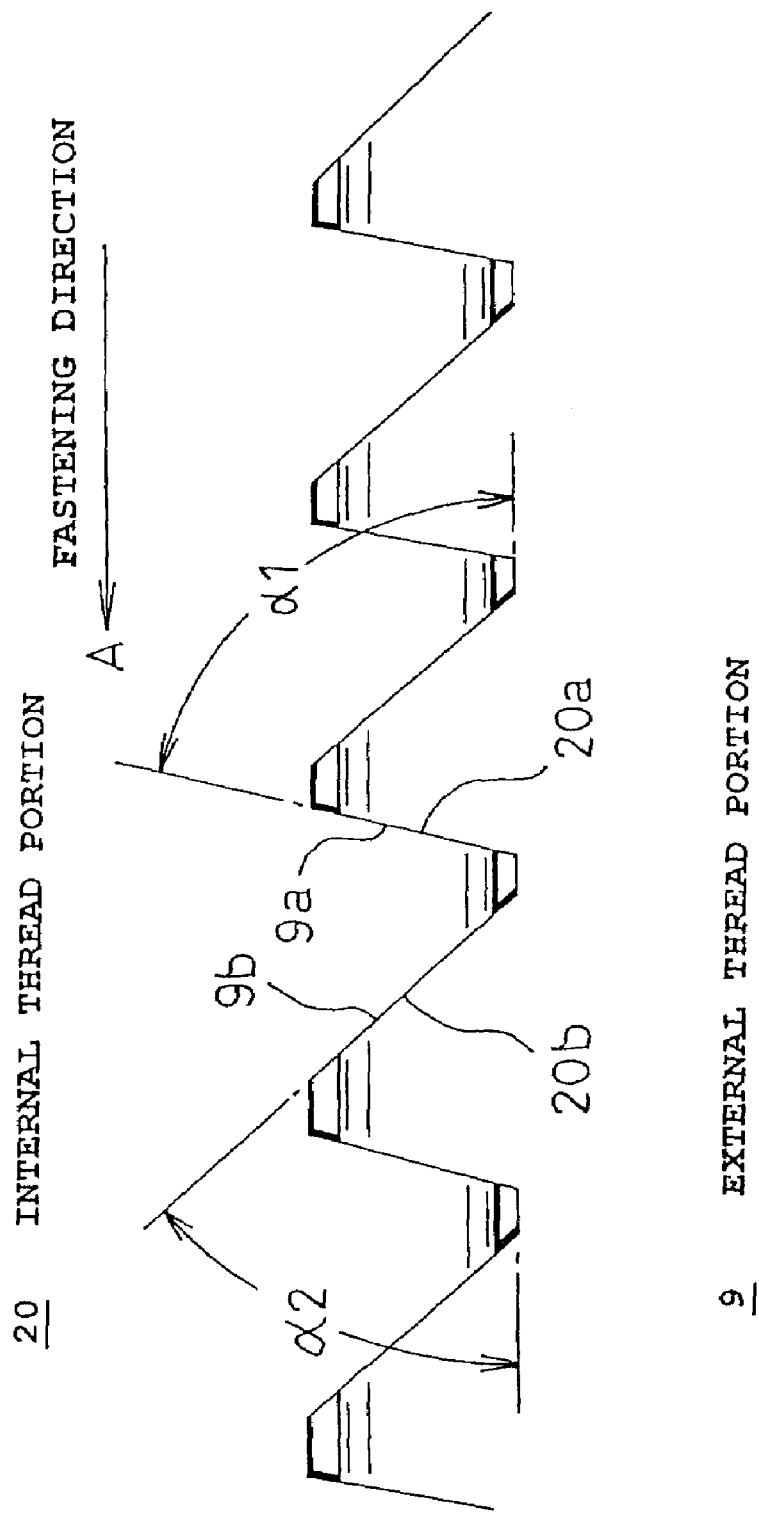
FIG. 2 is an enlarged section view of main portions of the pipe joint made of resin shown in FIG. 1.
Figure 4:
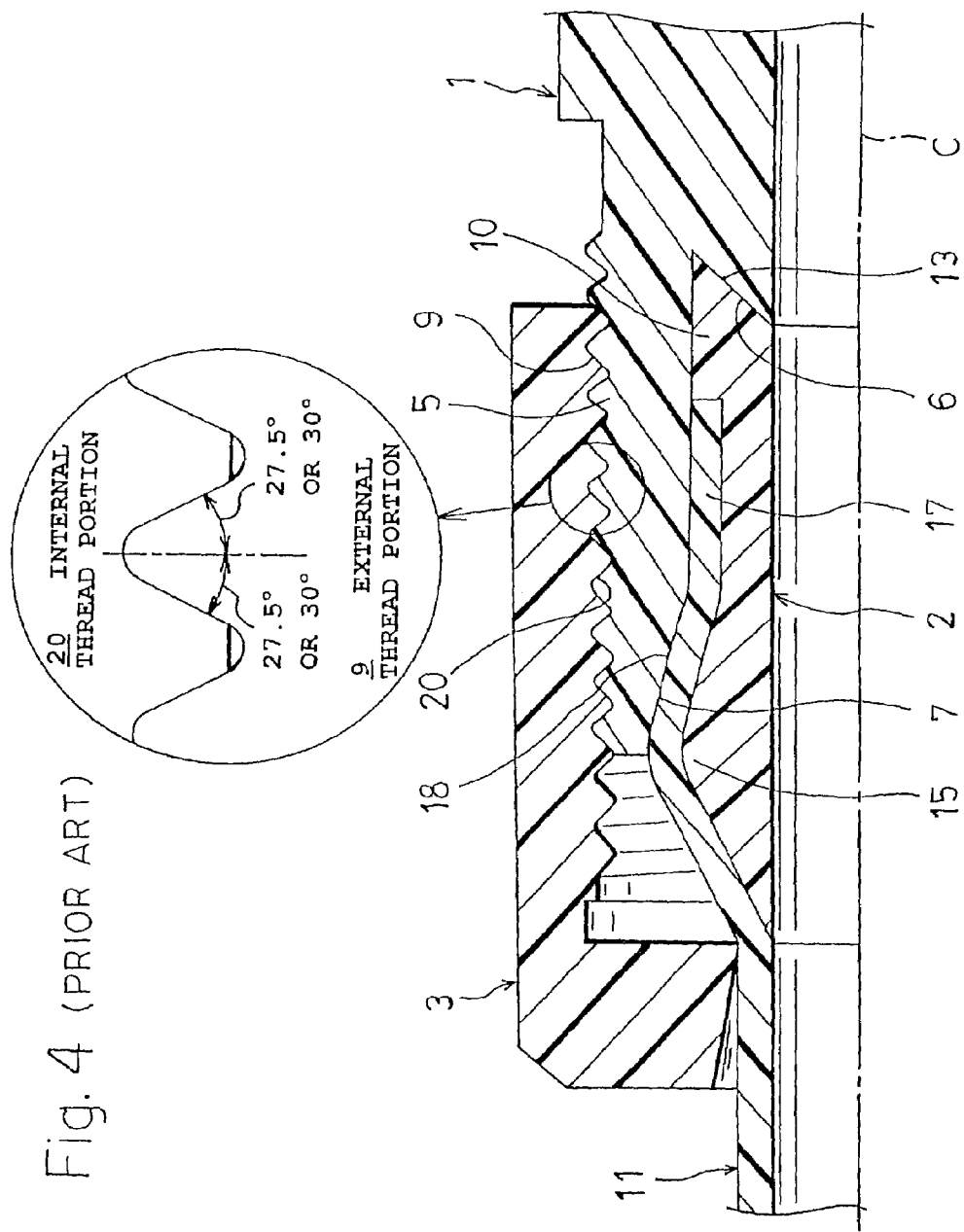
FIG. 4 is a half section view of a pipe joint made of resin of the conventional art.

An embodiment of the invention in which the invention is applied to the pipe joint made of resin shown in FIG. 1 will be described. Referring to FIGS. 1 and 2, the pipe joint made of resin comprises a joint body 1, a sleeve 2, and a union nut 3 which are made of a resin having excellent heat resistance and chemical resistance, such as fluororesin. The pipe joint is identical in the general configuration with the pipe joint made of resin of the conventional art shown in FIG. 4, but are different therefrom in the structures of the external thread portion 9 of the joint body 1 and the internal thread portion 20 of the union nut 3.

In the joint body 1, a pipe receiving port 5 is formed at least at one end of a cylindrical body portion 4, a sealing portion 6 is formed in an inner area of the pipe receiving port 5 so that the sealing portion intersects the axis C of the joint body 1, and a sealing portion 7 is formed in an entrance area of the pipe receiving port 5 so that the sealing portion intersect the axis C. An external thread portion 9 is formed on the outer periphery of the pipe receiving port 5. The inner diameter of the pipe receiving port 5 is larger than that of the body portion 4. In the inner area of the pipe receiving port 5, the sealing portion 6 is formed by a tapered face which is smaller in diameter as viewed when one moves further toward an outer side in the axial direction and then reaches the inner radial face of the body portion 4. On the other hand, the sealing portion 7 is formed by a tapered face which is larger in diameter as viewed when one moves further from the inner area of the pipe receiving port 5 toward an outer side in the axial direction and then reaches the end face of the pipe receiving port 5.

In the sleeve 2, a fining portion 10 having an outer diameter that allows the portion to be fitted into the receiving port 5 of the joint body 1 is formed in an inner end portion, and a press insertion portion 12 is formed continuously with the fitting portion 10. In the press insertion portion, the outer diameter of the vicinity of the portion continuous with the fitting portion 10 is smaller by a value corresponding to the thickness of the tube 11 made of resin such as fluororesin. The inner periphery of the sleeve 2 is formed so as to be in a same direction condition or have an inner diameter which is equal to or substantially equal to the inner diameters of the inner peripheries of the tube 11 and the body portion 4 of the joint body 1, so as not to impede movement (flow) of a fluid. An inner end sealing portion 13 which abuts against the sealing portion 6, and which is configured as a tapered face is formed in an end portion of the sleeve 2. By contrast, a tapered outer end sealing portion 14 is formed on the outer periphery of the outer end portion of the sleeve 2, i.e., the outer periphery of the press insertion portion 12. In the outer end sealing portion 14, the diameter is larger as viewed when one moves further from the outer end toward an inner side in the axial direction, and the outer end intersects the inner periphery of the sleeve 2. The diameter of the apex of the outer end sealing portion 14 is set to be larger than at least the outer diameter of the press insertion portion 12 of the portion continuous with the fitting portion 10. Namely, the larger-diameter side of the outer end sealing portion 14 is formed as a bulge portion 15 which has a mountain-like section shape, and which is formed on the outer peripheral face in the outer end side of the sleeve 2. A tapered face 16 in which the diameter becomes smaller from the apex of the bulge portion 15 to the inner end side of the sleeve 2 is formed so that the inclination angle is substantially equal to that of the sealing portion 7 of the joint body 1, and, when the inner end sealing portion 13 abuts against the sealing portion 6, the gap through which the sealing portion 7 is opposed to the tapered face 16 corresponds to the thickness of the tube 11.

The thus configures sleeve 2 is pressingly inserted into the one end portion 17 of the tube 11 to be integrally coupled to the tube 11 under a state where the press insertion portion 12 is pressingly inserted into the one end portion 17 of the tube 11 to increase the diameter of the peripheral wall of the one end portion 17 of the tube 11 and the fitting portion 10 of the sleeve 2 projects from the one end portion 17 of the tube 11. In a state where the one end portion 17 of the tube 11 is inserted into the pipe receiving port 5, the inner end sealing portion 13 abuts against the sealing portion 6 of the joint body 1 to exert a sealing function, and the outer end sealing portion 14 abuts against the inner face of the inclined portion of the one end portion 17 of the tube 11 to exert a sealing function. The one end portion 17 of the tube 11 is clamped in an inclined state between the sealing portion 7 of the joint body 1 and the tapered face 16 of the sleeve 2. Namely, the outer peripheral face of the tube 11 which is deformed along the tapered face 16 of the sleeve 2 serves as an outer peripheral sealing face 18 to abut against the sealing portion 7, thereby exerting a sealing function.

In the union nut 3, an internal thread portion 20 which is to be screwed to the external thread portion 9 of the joint body 1 is formed on the inner peripheral face of the cylindrical portion, and an annular flange portion 21 which extends from the outer end toward the axial center is formed. A pressing edge portion 22 is formed on the inner end side of the inner peripheral face of the flange portion 21. The pressing edge portion 22 is formed so that the pressing edge portion 22 is positioned closer to the axial center than the apex of the bulge portion 15 of the sleeve 2 and also the outer diameter of the portion continuous with the fitting portion 10.

In the thus configured pipe joint made of resin, the invention is characterized in the structures of the external thread portion 9 of the joint body 1 and the internal thread portion 20 of the union nut 3.

The section shape of each of the threads of the external thread portion 9 of the joint body 1 and the internal thread portion 20 of the union nut 3 is formed as an asymmetrical trapezoid, an included angle $\alpha_1$ of first flanks 91 and 20a of the assymmetrical trapezoidal threads which are made in contact with each other by fastening the union nut 3 is set to 70 to 90°, and an included angle $\alpha_2$ of second flanks 9b and 20b opposite to the flanks is set to 40 to 80°. In the above, $\alpha_1 > \alpha_2$.

In the thus configured pipe joint made of resin, the one end portion 17 of the tube 11 into which the press insertion portion 12 of the sleeve 2 is pressingly inserted is inserted into the receiving port 5 of the joint body 1, to cause the inner end sealing portion 13 to abut against the sealing portions 6. Thereafter, the internal thread portion 20 of the union nut 3 which is previously loosely fitted onto the outer periphery of the one end portion of the tube 11 is screw-fastened to the external thread portion 9 of the joint body 1, and rotated in the fastening direction A. As a result of this fastening rotation of the union nut 3, a large pressing force in the axial direction corresponding to the fastening torque is generated via the contacts of the flanks 20a and 9a of the internal and external thread portions 20 and 9 and having an included angle of 70 to 90°. Therefore, the sleeve 2 is strongly pressed against the joint body 1 by the pressing edge portion 22 of the union nut 3. This pressing action causes the sleeve 2 to be strongly clamped in the axial direction by the pressing edge portion 22 of the union nut 3 and the sealing portion 6 of the joint body 1, and the one end portion 17 of the tube 11 is connected to the joint body 1 in a sealed state.

Between the flanks 20a and 9a of the internal and external thread portions 20 and 9 and having an included angle of 70 to 90°, there occurs less slip. Even when the union nut 3 is strongly fastened, therefore, the threads of the internal thread portion 20 can be prevented from moving toward the radially outer side to cause the union nut to be freely rotated.

Since the included angle of the opposite flanks 9b and 20b of the internal and external thread portions 20 and 9 is set to an angle of 40 to 80° which is smaller than the included angle of the flanks 20a and 9a, the threads of the internal and external thread portions 20 and 9 were able to sufficiently withstand a high fastening torque of the union nut 3, and shearing fracture did not occur.

In this connected state of the tube 11, the one end portion 17 of the tube 11 is clamped between the sleeve 2 and the union nut 3 which are clamped in the axial direction as described above, and also by the press insertion portion 12 of the sleeve 2 and the sealing portion 7 of the pipe receiving port 5, and locally clamped by the outer end sealing portion 14 of the sleeve 2 and the pressing edge portion 22 of the sleeve 2. Therefore, the tube 11 can be held by a high resistance to slipping off so as to be prevented from moving to slip off. The sealing portion 6 of the joint body 1, and the inner end sealing portion 13 of the sleeve 2 are pressingly contacted to each other to produce a strong adhering force therebetween. At the same time, the sealing portion 7 of the joint body 1 is pressingly contacted to the outer peripheral sealing face 18 of the tube 11, and the outer end sealing portion 14 of the sleeve 2 is pressingly contacted to the inner face of the inclined portion of the tube 11, whereby a strong sealing force is produced between the contacting components so that the gaps therebetween are sealed by the both faces of the one end portion 17 of the tube 11.

As described above, sealing is performed between the joint body 1 and the sleeve 2, and between the sleeve 2 and the tube 11. Furthermore, sealing is performed between the joint body 1 and the tube 11. The sealing function and the function of preventing the tube 11 from slipping off can be maintained by the strong pressing force exerted by the union nut 3. When a fluid of a high temperature (hot water of 200° C.) is transported and a further fastening operation must be additionally performed, a required pressing force can be exerted by giving only a substantially constant rotation amount to the union nut 3. In addition to the case of a fluid of the ordinary temperature, even in the case of a fluid of a high temperature, therefore, the excellent sealing property is ensured so that leakage of the fluid or entry of a foreign substance can be surely prevented from occurring, whereby the reliability of the sealing property can be enhanced. Moreover, the tube 11 can be surely prevented from slipping off.

Figure 3:
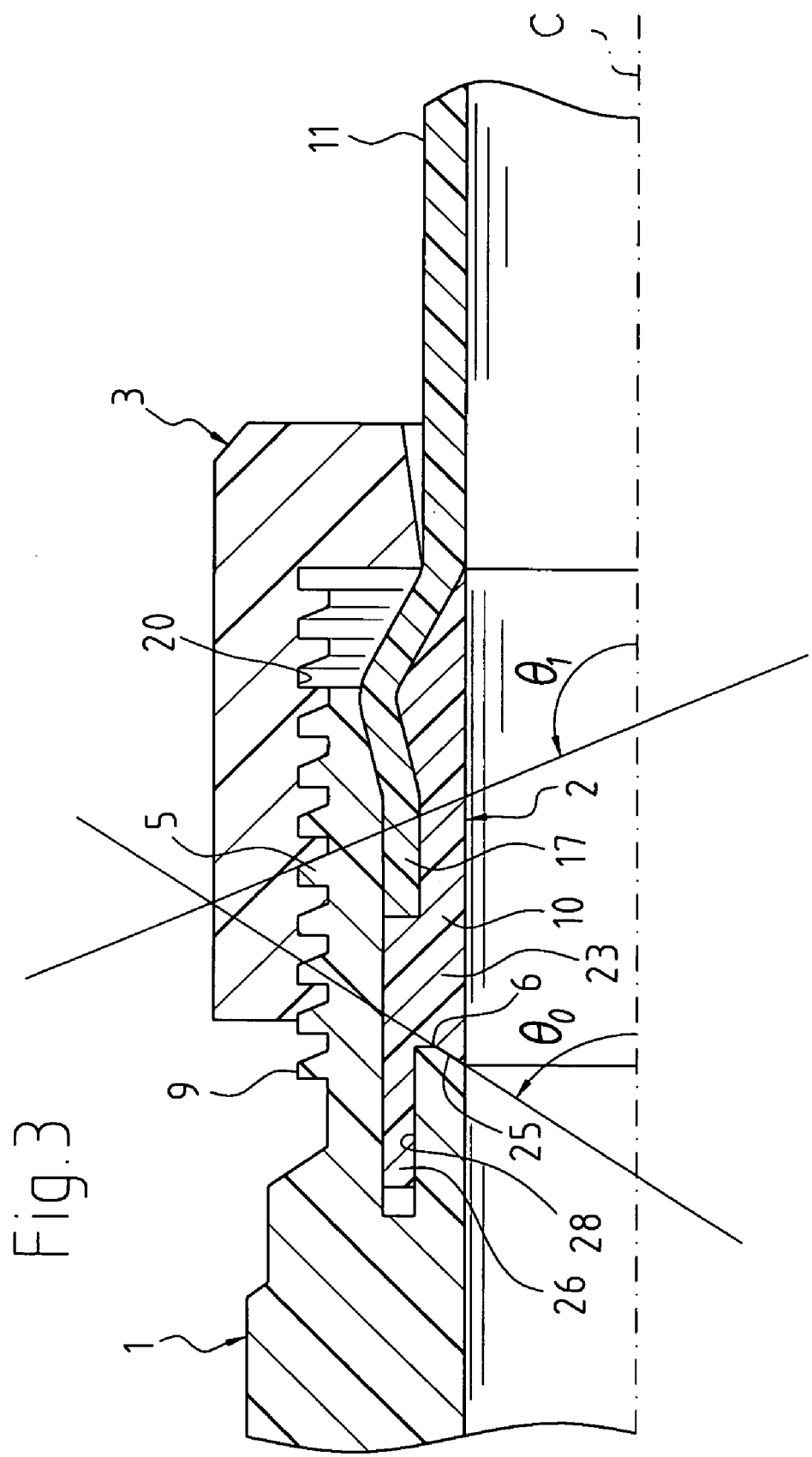
FIG. 3 is a half section view of a pipe joint made of resin which is another embodiment of the invention.
Figure 5:
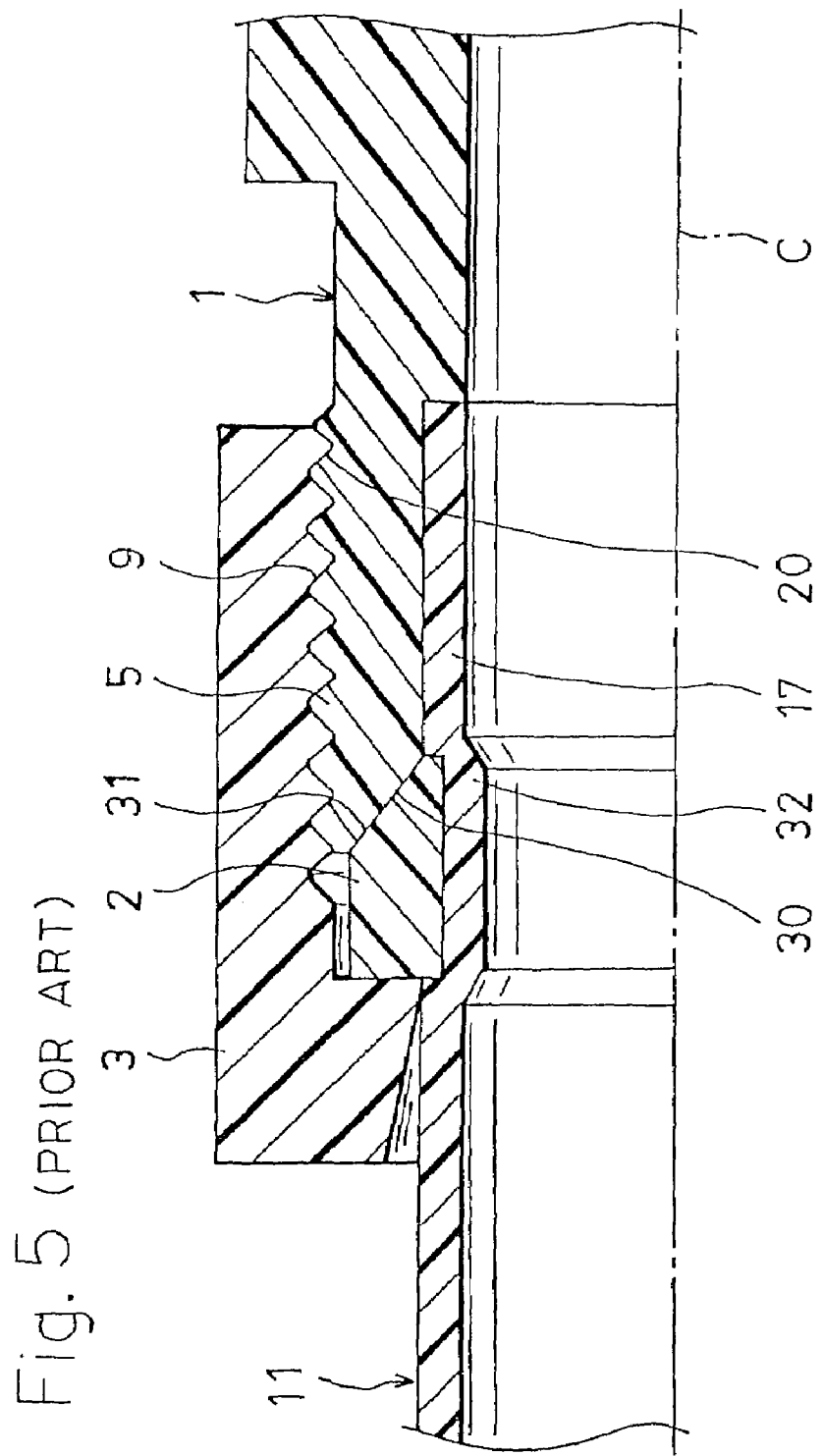
FIG. 5 is a half section view of another pipe joint made of resin of the conventional art.
Figure 6:
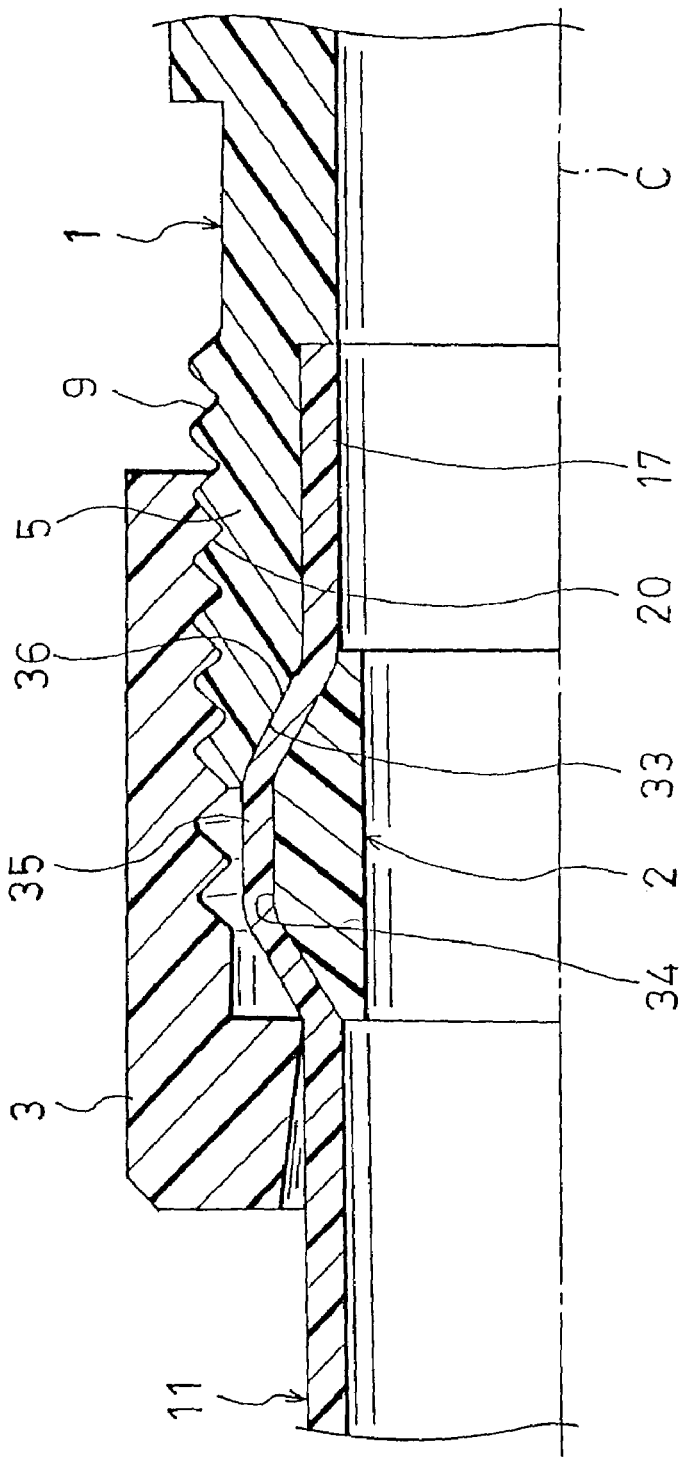
FIG. 6 is a half section view of a further pipe joint made of resin of the conventional art.

The invention can be similarly applied also to a pipe joint made of resin having the configuration shown in FIG. 3, and the above-mentioned pipe joints made of resin respectively having the configurations shown in FIGS. 5 and 6, in addition to the pipe joint made of resin of the above-described embodiment.

In the pipe joint made of resin shown in FIG. 3, a cylindrical sealing portion 26 which is projected outward in the axial direction and more outward in a radial direction than a protruding inner end face 25 which abuts against the sealing portion 6 in the inner area of the pipe receiving port 5 of the joint body 1 is formed in a protruding portion 23 of the sleeve 2 that protrudes from the one end portion 17 of the tube 11. An annular groove 28 is formed more outward in a radial direction than the sealing portion 6 in the inner area of the pipe receiving port 5 of the joint body 1. The annular groove 28 is used for generating a surface pressure in a radial direction in accordance with press insertion of the cylindrical sealing portion 26, thereby forming the sealing portion 7. In this case, sealing is performed at least between the outer periphery of the cylindrical sealing portion 26 and that in the annular groove 28. The other configuration is substantially identical with that of the pipe joint made of resin shown in FIG. 1.

Also in the pipe joint made of resin, when the external thread portion 9 of the joint body 1 and the internal thread portion 20 of the union nut 3 are configured in the same manner as those of the above-mentioned embodiment, a structure is obtained in which, while generating a large pressing force in the axial direction, the strength of the threads is enhanced so that the threads can withstand a high fastening torque of the union nut 3. Therefore, it is possible to attain the same effect as that described above, namely, the effect that, in both the cases of a fluid of the ordinary temperature and that of a high temperature, a pressing force required for the sealing property, the resistance to tube slipping off, and the like can be exerted by giving only a constant rotation amount to the union nut 3.

As shown in FIGS. 1 and 3, $\theta_0$ marks the angle and direction of the taper of sealing portion 6 against the taper surface 13 of the joint body 1 relative to the axis C. $\theta_1$ is the angle of external thread portion flank 9$b$, 20$b$, as illustrated in FIG. 2, also relative to axis C. In all embodiments, the value of angle $\theta_0$ is less than the value of angle $\theta_1$ (i.e., $\theta_0 < \theta_1$). Actually, in case of reciting only the condition of $\theta_0 < \theta_1$, it cannot include a joint embodiment of the present invention as shown in FIG. 3 because the direction of the taper surface 13 of the joint body 1 in FIG. 1 is opposite to that of the joint in FIG. 3.

For the joints of FIGS. 1 and 3, angles $\theta_0$ and $\theta_1$ can be used to determine the coefficients of conversion of axial component forces. Specifically, the absolute value of the cosine of $\theta_0$, or $|\cos \theta_0|$, is the coefficient of conversion of an axial component of force for a force which presses the sealing portion 6 against the taper surface 13 of the joint body 1. The absolute value of the cosine of $\theta_1$, or $|\cos \theta_1|$, equates to the coefficient of conversion of an axial component force of a force exerted on the side of a screw thread 9, when a torque is applied to union nut 3, thereby pressing sleeve 2 against joint body 1. In any embodiment, in addition to the above condition that $\theta_0 < \theta_1$, the condition $|\cos \theta_0| > |\cos \theta_1|$ exists.

As stated above $|\cos \theta_0|$ and $|\cos \theta_0|$ are the coefficients of conversion of the axial component force. Assuming that a force F for advancing the inner ring to the inner area of the joint body, which is created by screwing advancement of nut 3, exists, the force required for screwing advancement of nut 3 and the force for pressing the inner ring against the joint body 1 are shown as below.

$$\text{Force required for screwing advancement of the nut} = \frac{F}{|\cos \theta_1|}$$

$$\text{Force for pressing the inner ring against the joint body} = \frac{F}{|\cos \theta_0|}$$

The relationship between the force required for screwing the advancement of the force for pressing the inner ring against the joint body can be described as:

$$\frac{F}{|\cos \theta_1|} \geq \frac{F}{|\cos \theta_1|}$$

This means that the pressing force of the inner ring is smaller than the force of screwing advancement of the nut. Therefore, even though the nut is screwingly advanced by a large torque, the force $|\cos \theta_1|/|\cos \theta_0|$ is less than one time as strong as a thrust to be generated by the pressing force of the inner ring. In other words, the joint has a structure which facilitates slight adjustment of the pressing force of the inner ring (in the same way as a screw of a micrometer.)

As the joint is made of synthetic resin, creep phenomenon will invariably appear. So, in order to delay the appearance of creep, it is required to strictly control the pressing force within in the join. Since relations of $|\cos \theta_0| > |\cos \theta_1|$ exists, it is possible to slightly adjust the pressing force and ensures maintenance of the joint efficiency. The present invention has a structure that allows a relatively small pressing force compared to the thrust of the nut.

In each of the pipe joints made of resin shown in FIGS. 5 and 6, when the external thread portion 9 of the joint body 1 and the internal thread portion 20 of the union nut 3 are configured in the same manner as the above-described embodiment, a structure is obtained in which, while generating a large pressing force in the axial direction, the strength of the threads is enhanced so that the threads can withstand a high fastening torque of the union nut 3. Therefore, it I possible to attain the same effect as that described above, namely, the effect that, in both cases of a fluid of ordinary temperature and that of a high temperature, a pressing force required for the sealing property, the resistance to tube slipping off, and the like can be exerted by giving only a constant rotation amount to the union nut 3.

What is claimed is:

1. A pipe joint made of resin, comprising:
   a joint body which is made of resin, said joint body having a pipe receiving port at one end portion, and an external thread portion on an outer periphery of said pipe receiving port;
   a sleeve which is made of resin, and which is pressingly inserted into an inner or outer periphery of one end portion of a tube made of resin, to be integrated therewith; and
   a union nut which is made of resin, which has an internal thread portion, and which is loosely fitted onto the outer periphery of said one end portion of said tube, and which is screwed via said internal thread portion to said external thread portion of said joint body, said one end portion of said tube into which said sleeve is pressingly inserted to be integrated therewith being inserted into said pipe receiving port, a gap between said one end portion of said tube and said pipe receiving port of said joint body being sealed via said sleeve which is pressed against said joint body by fastening said union nut, wherein:
   a section shape of each thread of said external thread portion of said joint body and said internal thread portion of said union nut is formed as an asymmetrical trapezoid, defining a first flank and a second flank and having an included angle of said first flanks of said asymmetrical trapezoidal which contact with each other by fastening said union nut is set to 70 to 90°, and an included angle of said second flanks opposite to said first flanks is set to 40 to 80°, wherein said joint body defines a sealing portion the angle and direction of taper of which is defined by an angle $\theta_0$, said external thread is defined by an angle $\theta_1$, and wherein $\theta_0 < \theta_1$ and $|\cos \theta_0| > |\cos \theta_1|$.

2. A pipe joint made of resin, comprising:
   a joint body which is made of resin, said joint body having a pipe receiving port in one end portion, and an external thread portion on an outer periphery of said pipe receiving port;
   a sleeve which is made of resin, which is to be pressingly inserted into an inner periphery of an one end portion of a tube made of resin, and in which an inner end sealing portion is formed in an inner end portion; and
   a union nut which is made of resin, which has an internal thread portion, which is loosely fitted onto an outer periphery of said one end portion of said tube, and which is screwed via an internal thread portion to said external thread portion of said joint body, a sealing portion being formed in an inner area of said pipe receiving port by a tapered face which is smaller in diameter as one moves further toward an outer side in an axial direction and then reaches an inner radial face of said joint body, said one end portion of said tube into which said sleeve is pressingly inserted to be integrated therewith being inserted into said pipe receiving port, said inner end sealing portion of said sleeve which is pressed against said joint body by fastening said union nut abutting against said sealing portion, thereby sealing a gap between said one end portion of said tube and said pipe receiving port of said joint body, wherein a second shape of each of threads of said external thread portion of said joint body and said internal thread portion of said union nut is formed as an asymmetrical trapezoid, defining a first flank and a second flank and having an included angle of said first flanks of said asymmetrical trapezoidal threads which contact with each other by fastening said union nut is set to 70 to 90°, and an included angle of said second flanks opposite to said first flanks is set to 40 to 80°, wherein said joint body defines a sealing portion the angle and direction of taper of which is defined by an angle $\theta_0$, said external thread is defined by an angle $\theta_1$, and wherein $\theta_0 < \theta_1$ and $|\cos \theta_0| > |\cos \theta_1|$.

3. A pipe joint made of resin, comprising:

a joint body which is made of resin, said joint body having a pipe receiving port in one end portion, and an external thread portion on an outer periphery of said pipe receiving port;

a sleeve which is made of resin, which is to be pressingly inserted into an inner periphery of an one end portion of a tube made of resin, and in which a cylindrical sealing portion is formed in an inner end portion; and a union nut which is made of resin, which has an internal thread portion, which is loosely fitted onto an outer periphery of said one end portion of said tube, and which is screwed via an internal thread portion to said external thread portion of said joint body an annular groove being formed in an inner area of said pipe receiving port, said one end portion of said tube into which said sleeve is pressingly inserted to be integrated therewith being inserted into said pipe receiving port, said cylindrical sealing portion of said sleeve which is pressed against said joint body by fastening said union nut being pressingly inserted into said annular groove, thereby sealing a gap between said one end portion of said tube and said pipe receiving port of said joint body, wherein a section shape of each of threads of said external thread portion of said joint body and said internal thread portion of said union nut is formed as an asymmetrical trapezoid, defining a first flank and a second flank and having an included angle of said first flanks of said asymmetrical trapezoidal threads which contact with each other by fastening said union nut is set to 70 to 90°, and an included angle of said second flanks opposite to said first flanks is set to 40 to 80°, wherein said joint body defines a sealing portion the angle and direction of taper of which is defined by an angle $\theta_0$, said external thread is defined by an angle $\theta_1$, and wherein $\theta_0 < \theta_1$ and $|\cos \theta_0| > |\cos \theta_1|$.

4. A pipe joint made of resin according to claim 2, wherein sealing is performed between overlapping faces of an outer periphery of said cylindrical sealing portion and an outer periphery in said annular groove.

* * * * *